Patented Jan. 22, 1935

1,989,042

UNITED STATES PATENT OFFICE 1,989,042

NITROGENOUS POLYMERIZATION PRODUCT

Max Albert Kunz, Mannheim, and Karl Koeberle and Erich Berthold, Ludwigshafen-on-the-Rhine, Germany, assignors to General Aniline Works, Inc., New York, N. Y., a corporation of Delaware No Drawing. Application December 4, 1930, Serial No. 500,136. In Germany December 11, 1929

6 Claims. (Cl. 260—27)

The present invention relates to derivatives of the hypothetical trihydrocyanic acid and process of producing same.

We have found that derivatives of the hypothetical trihydrocyanic acid:

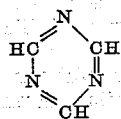

are obtained in excellent yields in a manner readily carried out industrially by treating cyclic cyanogen compounds, especially aromatic carbocyclic and heterocyclic cyanogen compounds with inorganic acid condensing agents practically free from water, whereby, when treating mononuclear cyclic cyanogen compounds, halides must be present. Acid condensing agents of the aforesaid kind are, for example, sulphuric acid, oleum, chlorosulphonic acid, phosphoric acid, hydrogen halides, aluminium chloride, zinc chloride and phosgene. When polymerizing mononuclear cyanogen compounds the presence of halides may be ensured by employing such of the beforementioned condensing agents as are themselves halides, such as for example chlorosulphonic acid, or mixtures of the said condensing agents comprising such halides, or by adding other halides, such as alkali metal or alkaline earth metal halides, to the beforementioned condensing acids. The polymerization may also be carried out in the presence of organic solvents or diluents, the presence of such diluents being advantageous when effecting polymerization by means of acid chlorides. Organic diluents which may be used are for example benzene and its homologues, halogenbenzenes, nitrobenzenes, pyridine and glacial acetic acid. The polymerization takes place already at ordinary temperatures with evolution of heat. With cyclic cyanogen compounds of the benzene and naphthalene series polymerization occurs so violently that it is advantageous to cool the reaction mixture, whereas with cyanogen compounds of the anthraquinone series the reaction mixture may be warmed slightly. Thus for example when para-tolunitrile is intrdouced into chlorsulphonic acid, pure 2,4,6-tri-para-tolyl-1,3,5-triazine is obtained in very good yields within a few minutes. When a mixture is homologous nitriles is employed, mixed 2,4,6-triaryl- or arylalkyl-1,3,5-triazines are obtained.

The polymerization products usually obtained in good yields may be purified by the usual methods if necessary. They are generally speaking soluble with great difficulty in organic solvents but with comparative ease in concentrated sulphuric acid.

The reaction products obtainable according to the present invention are partly already dyestuffs and partly valuable intermediate products for the preparation of dyestuffs. They may also be employed for pharmaceutical purposes, as vulcanization accelerators and the like.

The polymerization products of cyanogen compounds of the anthraquinone series and other cyanogen compounds capable of being vatted but which need have no affinity for the fibres, usually constitute valuable vat dyestuffs giving powerful dyeings.

The following examples will further illustrate the nature of this invention, but the invention is not restricted to these examples. The parts are by weight.

Example 1

2 parts of benzonitrile are introduced while stirring into 20 parts of chlorsulphonic acid cooled to 5° below zero centigrade, stirring is continued for a short time at from 0° to 10° centigrade, the temperature is allowed to rise to room temperature, stirring is continued for some time and the reaction mixture is poured onto ice and the 2,4,6-triphenyl-1,3,5-triazine (cyanphenine) which separates in the form of a white flocculent precipitate is filtered off by suction. The yield is practically theoretical. The crude product which corresponds to the formula:

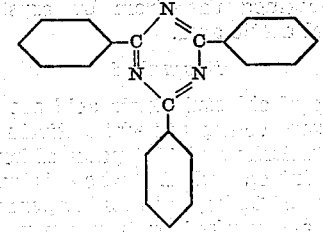

melts at from 231° to 233° centigrade. It is obtained in the form of well-shaped colourless needles melting at 233° C. by crystallization from glacial acetic acid or xylene for example. The melting point of the product mixed with cyanphenine prepared in other ways shows no depression.

The polymerization may also be carried out at lower or higher temperatures than those specified.

Example 2

1 part of para-tolunitrile is introduced a little at a time into 10 parts of chlorsulphonic acid cooled to 10° below zero centigrade, the whole is kept at the same temperature for half an hour, allowed to warm up slowly to room temperature, diluted with 5 parts of concentrated sulphuric acid, poured into ice-water, filtered by suction, and the filter cake washed until neutral and dried. The crude 2,4,6-tri-para-tolyl-1,3,5-triazine which corresponds to the formula:

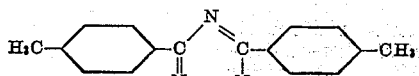

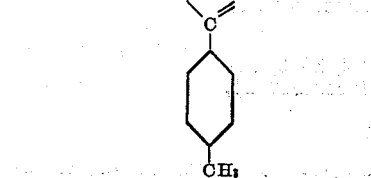

obtained in a yield of about 90 per cent is a colourless powder which melts at from 274° to 276° C. It crystallizes from glacial acetic acid, toluene, xylene and nitrobenzene, in which it is soluble with comparative difficulty, in the form of large colourless needles which melt at from 278° to 279° C.

*Example 3*

2 parts of meta-tolunitrile are introduced into 20 parts of chlorsulphonic acid at room temperature while stirring. The polymerization is completed as soon as a sample withdrawn and poured into water yields a flocculent precipitate. The reaction mixture is worked up in the usual manner. The reaction product, 2,4,6-tri-meta-tolyl-1,3,5-triazine corresponding to the formula:

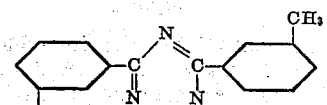

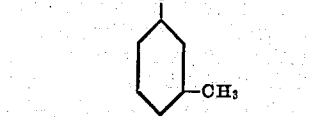

obtained in very good yields in the form of a colourless powder, melts at from 145° to 148° C. Colourless needles melting at from 152° to 153° C. may be obtained therefrom by crystallization from glacial acetic acid.

*Example 4*

200 parts of chlorsulphonic acid are cooled to 10° below zero centigrade while stirring, 6 parts of para-tolunitrile and 10.3 parts of benzonitrile are slowly introduced, the whole is warmed to from 20° to 30° C., kept at this temperature for a short time and worked up in the usual manner. The resulting polymerization product is a colourless powder which melts at from 176° to 178° C. Colourless needles may be obtained therefrom by crystallization, for example from glacial acetic acid.

*Example 5*

2 parts of benzonitrile are dissolved at 5° C. in 20 parts of 12 per cent oleum. Dry hydrogen bromide is led into the solution until a sample withdrawn and poured into water deposits a white flocculent precipitate. The whole is then worked up in the usual manner. The reaction product obtained is identical with that obtainable according to Example 1.

*Example 6*

2 parts of beta-naphthonitrile are introduced into 20 parts of chlorsulphonic acid cooled to about zero centigrade and the whole is kept at from 10° to 20° C. for several hours while stirring. The mixture is then diluted with anhydrous sulphuric acid, poured into ice-water and filtered by suction. The reaction product obtained which probably corresponds to the formula:

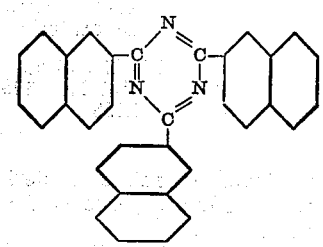

is a colourless powder which melts at about 290° C. and which may be obtained in the form of colourless needles by crystallization from organic solvents.

Under the said conditions, alpha-naphthonitrile reacts in a similar manner.

*Example 7*

125 parts of 2-amino-3-cyanoanthraquinone are dissolved in 1250 parts of 23 per cent oleum while stirring and the whole is heated to from 50° to 80° C. As soon as a sample withdrawn yields orange dyeings on cotton from an olive brown vat the whole is allowed to cool and is worked up as described in Example 6. The polymerization product obtained which probably corresponds to the formula:

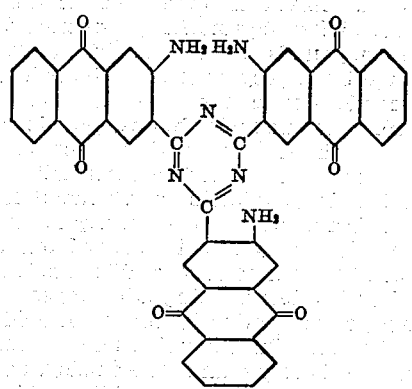

is an orange powder which dissolves in concentrated sulphuric acid giving an orange colouration and which is practically insoluble in almost all organic solvents. It may be purified, when necessary, by dissolution in sulphuric acid and dilution of the solution with water or dilute sulphuric acid by way of the oxonium sulphate which separates as a crystalline precipitate.

The same polymerization product is obtained by treating 2-amino-3-cyanoanthraquinone with hydrochloric acid, acid chlorides, as for example phosgene, it being preferable to work in the presence of diluents and at higher temperatures.

What we claim is:—

1. A process for the manufacture of nitrogenous polymerization products which are probably triazine derivatives, which comprises treating a nitrile of a mononuclear carbocyclic compound with a sulphuric acid practically free from water in the presence of a halide.

2. Polymerized homologues of benzonitrile which are probably triazine derivatives, the said polymerization products being difficultly soluble in organic solvents and readily soluble in concentrated sulphuric acid.

3. Polymerized methyl derivatives of benzonitrile which are probably triazine derivatives, the said polymerization products being difficultly soluble in organic solvents from which they crystallize in colourless needles, but readily soluble in concentrated sulphuric acid.

4. A process for the manufacture of nitrogenous polymerization products which are probably triazine derivatives, which comprises treating a nitrile of a carbocyclic compound with an inorganic acid condensing agent practically free from water and comprising a halide.

5. A process for the manufacture of nitrogenous polymerization products which are probably triazine derivatives, which comprises treating a nitrile of a carbocyclic polynuclear compound with a halogen containing inorganic acid condensing agent practically free from water.

6. A process for the manufacture of nitrogenous polymerization products which are probably triazine derivatives, which comprises treating a nitrile of a carbocyclic polynuclear compound with chlorosulfonic acid.

MAX ALBERT KUNZ.
KARL KOEBERLE.
ERICH BERTHOLD.